Sept. 1, 1931. M. RESEK 1,821,769
LIQUID SUPPLY SYSTEM AND OIL BURNING APPARATUS INCORPORATING SAME
Original Filed Oct. 6, 1926 9 Sheets-Sheet 1

Sept. 1, 1931.  M. RESEK  1,821,769

LIQUID SUPPLY SYSTEM AND OIL BURNING APPARATUS INCORPORATING SAME

Original Filed Oct. 6, 1926  9 Sheets-Sheet 2

Inventor
Marc Resek
By Hull, Brock & West
Attys.

Sept. 1, 1931.   M. RESEK   1,821,769
LIQUID SUPPLY SYSTEM AND OIL BURNING APPARATUS INCORPORATING SAME
Original Filed Oct. 6, 1926   9 Sheets-Sheet 5

Inventor
Marc Resek
By Shull, Brock & West
Attys.

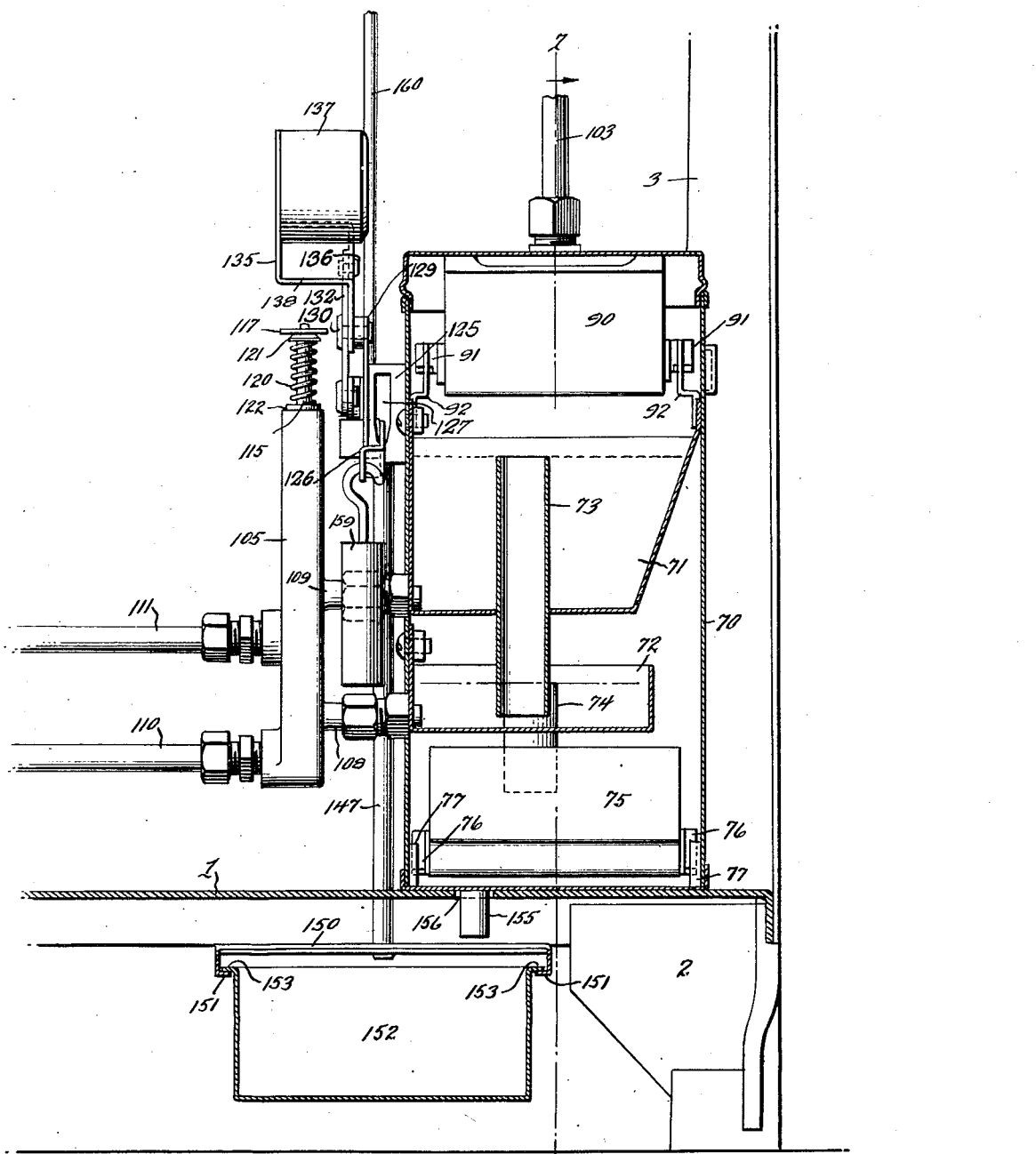

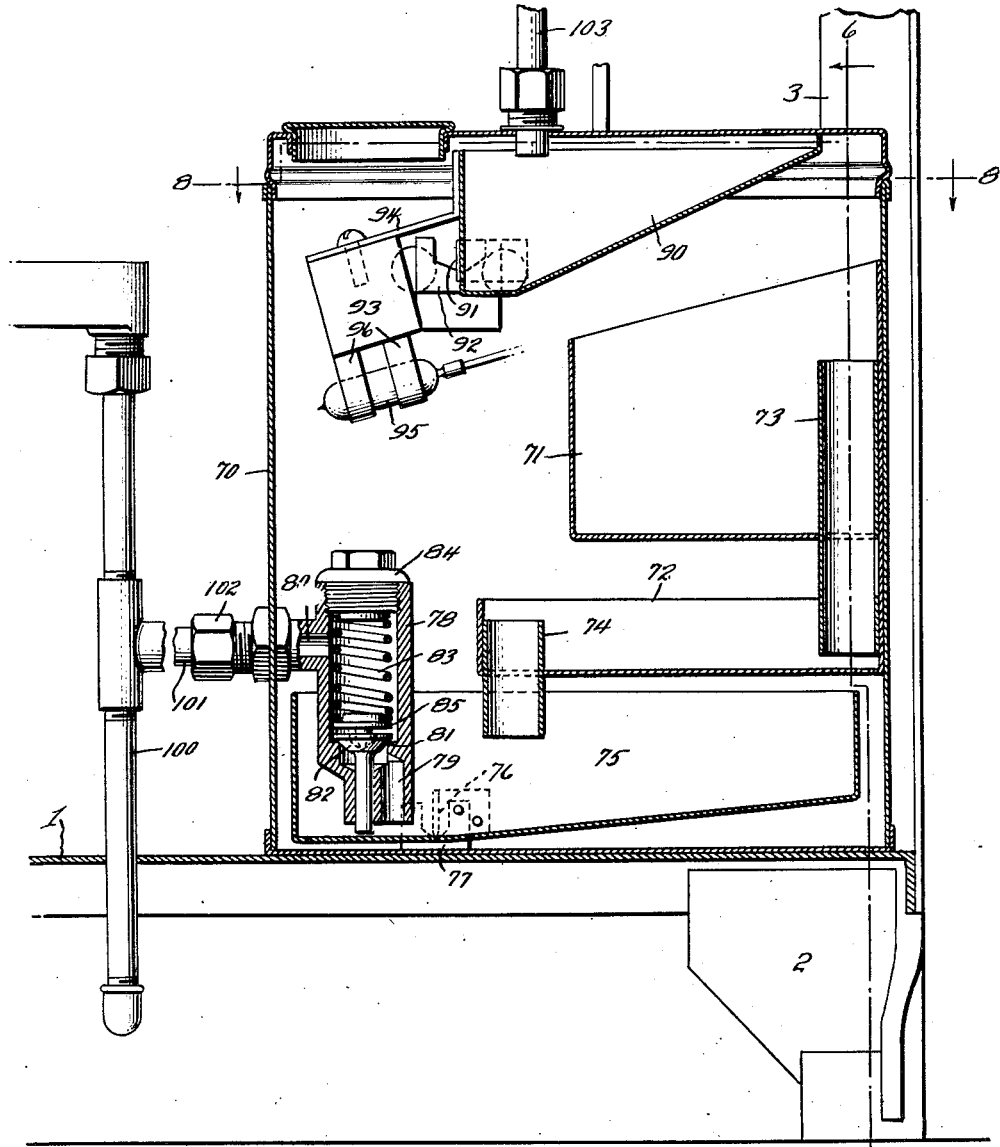
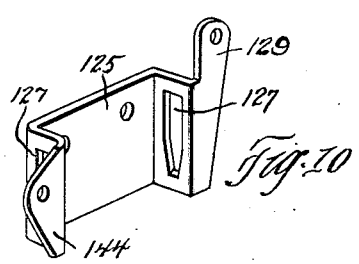
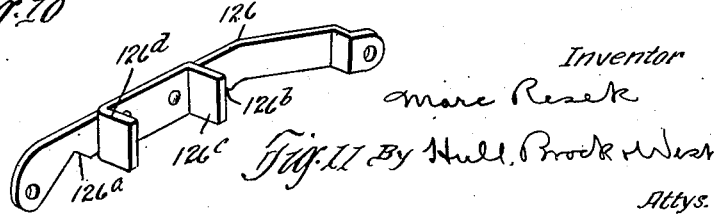

Sept. 1, 1931.  M. RESEK  1,821,769
LIQUID SUPPLY SYSTEM AND OIL BURNING APPARATUS INCORPORATING SAME
Original Filed Oct. 6, 1926  9 Sheets-Sheet 8
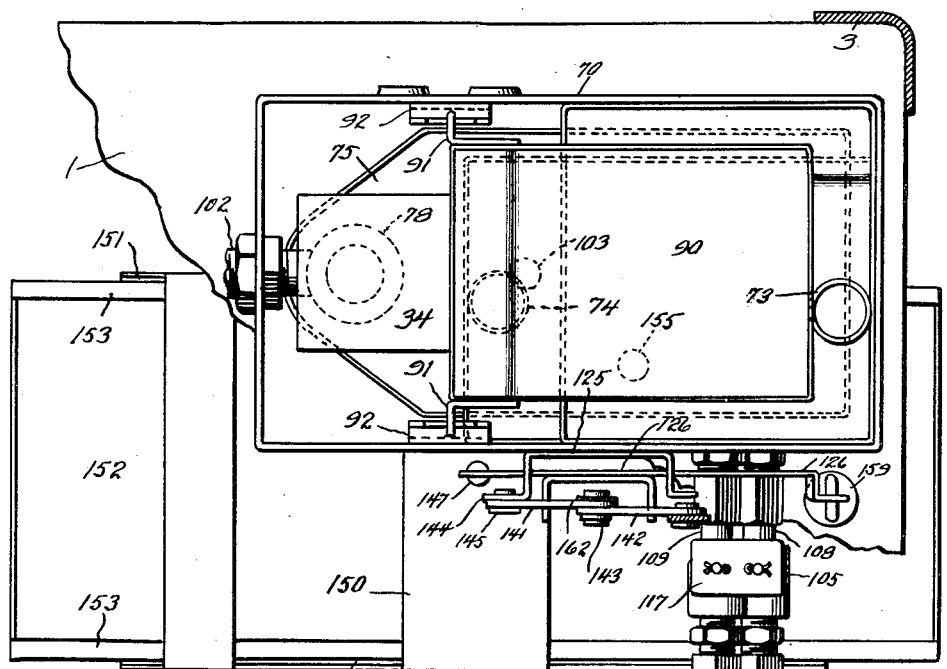
Fig. 8
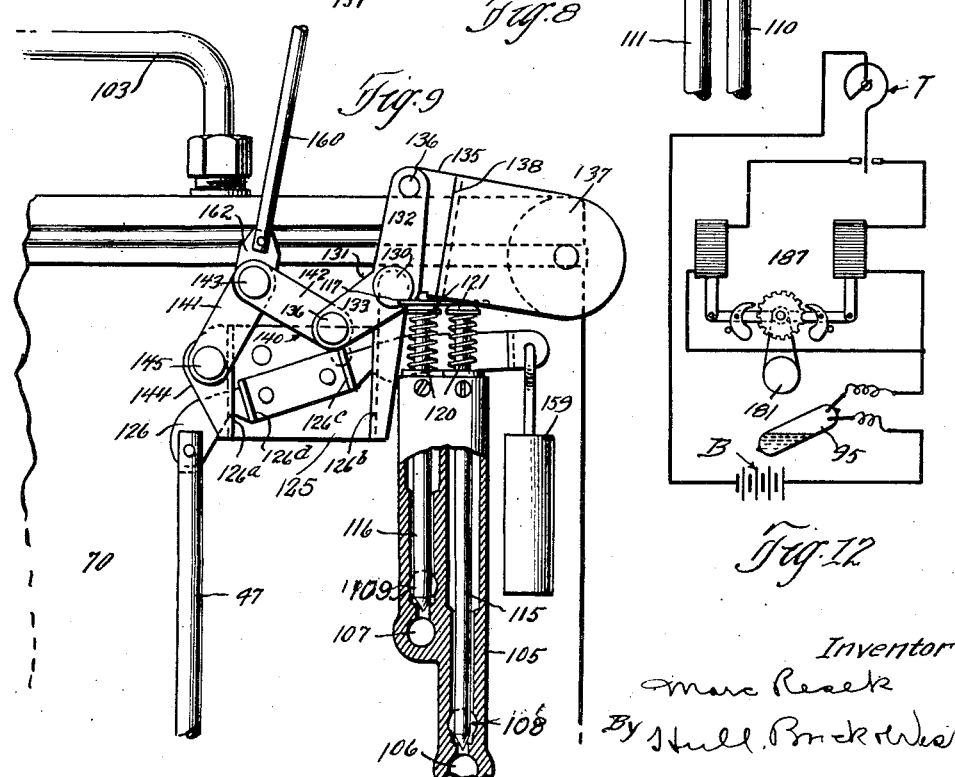
Fig. 9
Fig. 12
Inventor
Marc Resek
By Hull, Brock & West
Attys.

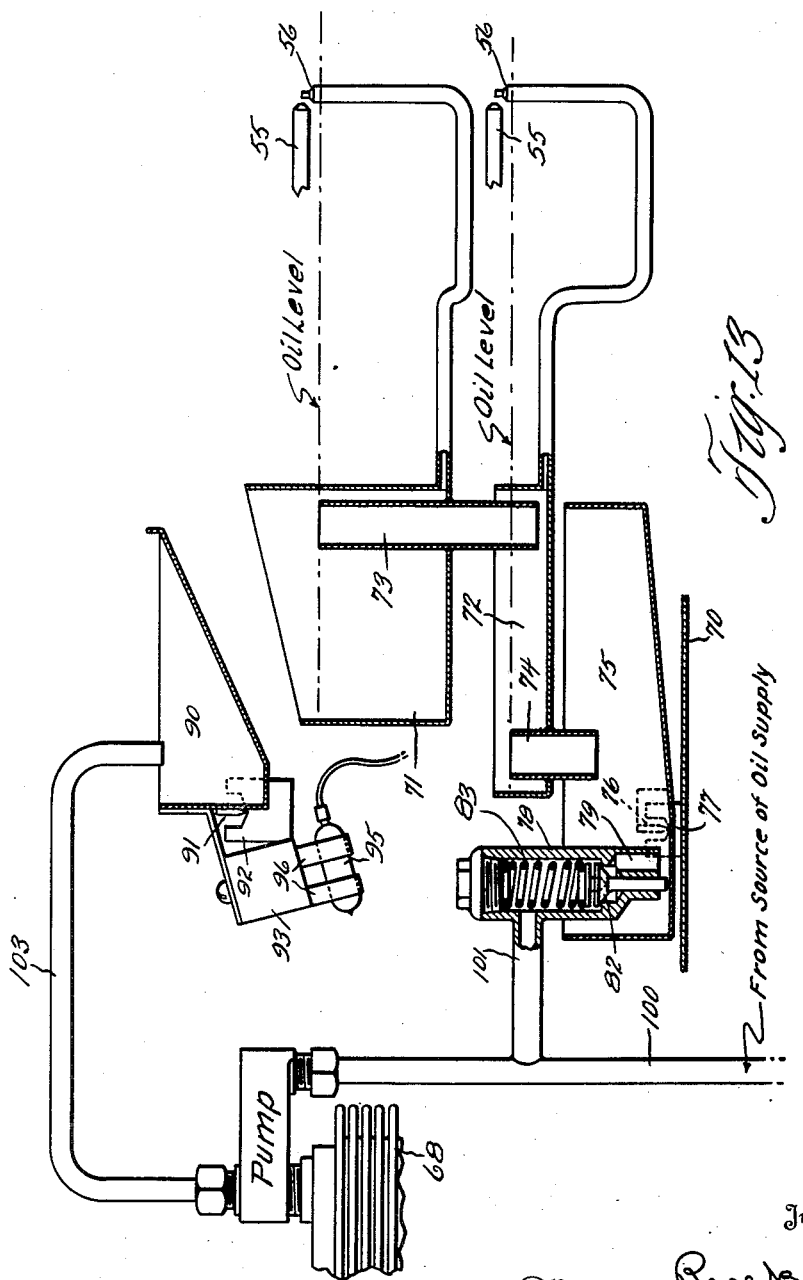

Patented Sept. 1, 1931

1,821,769

UNITED STATES PATENT OFFICE

MARC RESEK, OF CLEVELAND HEIGHTS, OHIO, ASSIGNOR TO PERFECTION STOVE COMPANY, OF CLEVELAND, OHIO, A CORPORATION OF OHIO

LIQUID SUPPLY SYSTEM AND OIL BURNING APPARATUS INCORPORATING SAME

Original application filed October 6, 1926, Serial No. 139,877. Divided and this application filed February 15, 1929. Serial No. 340,224.

This application is a division of my former application Serial No. 139,877, filed October 6, 1926, and the title of which is Dual control heating systems; and the subject matter of the present case is restricted to a liquid supply system, and more particularly to a liquid fuel supply, with its appurtenances, that is embodied in the system of the parent application.

The objects of the invention that constitutes the subject matter of the present case are to provide efficient oil feeding and control means for oil burning apparatus; to provide a safety appliance for such apparatus that will operate automatically to shut off the oil supply to the burner in case the normal oil circulation through the system is interrupted, or in case the apparatus becomes overheated, or that may be operated manually from a remote point; to provide electromagnetic control mechanism for oil burning apparatus of the character aforesaid wherein a switch in the circuit of said mechanism is operated by the oil flow; and to provide a liquid supply system, susceptible to use in other connections than with heating systems, comprising, in combination with a source of liquid supply, a dispensing chamber wherein a given liquid level is maintained by overflow, and means for recirculating the overflow liquid through the chamber, with additional liquid drawn from said source to replace that dispensed from said chamber.

Figure 1:
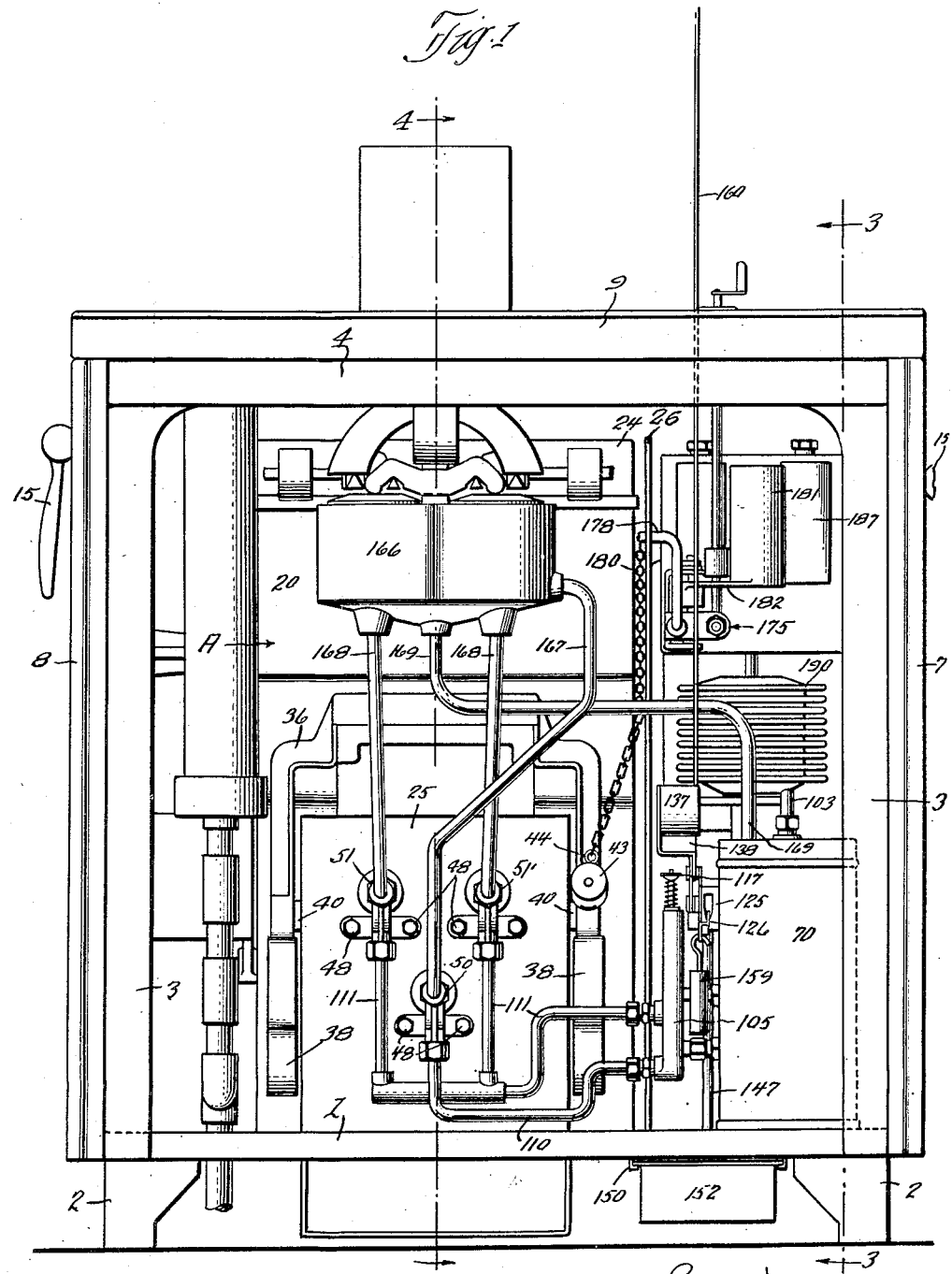
Figure 2:
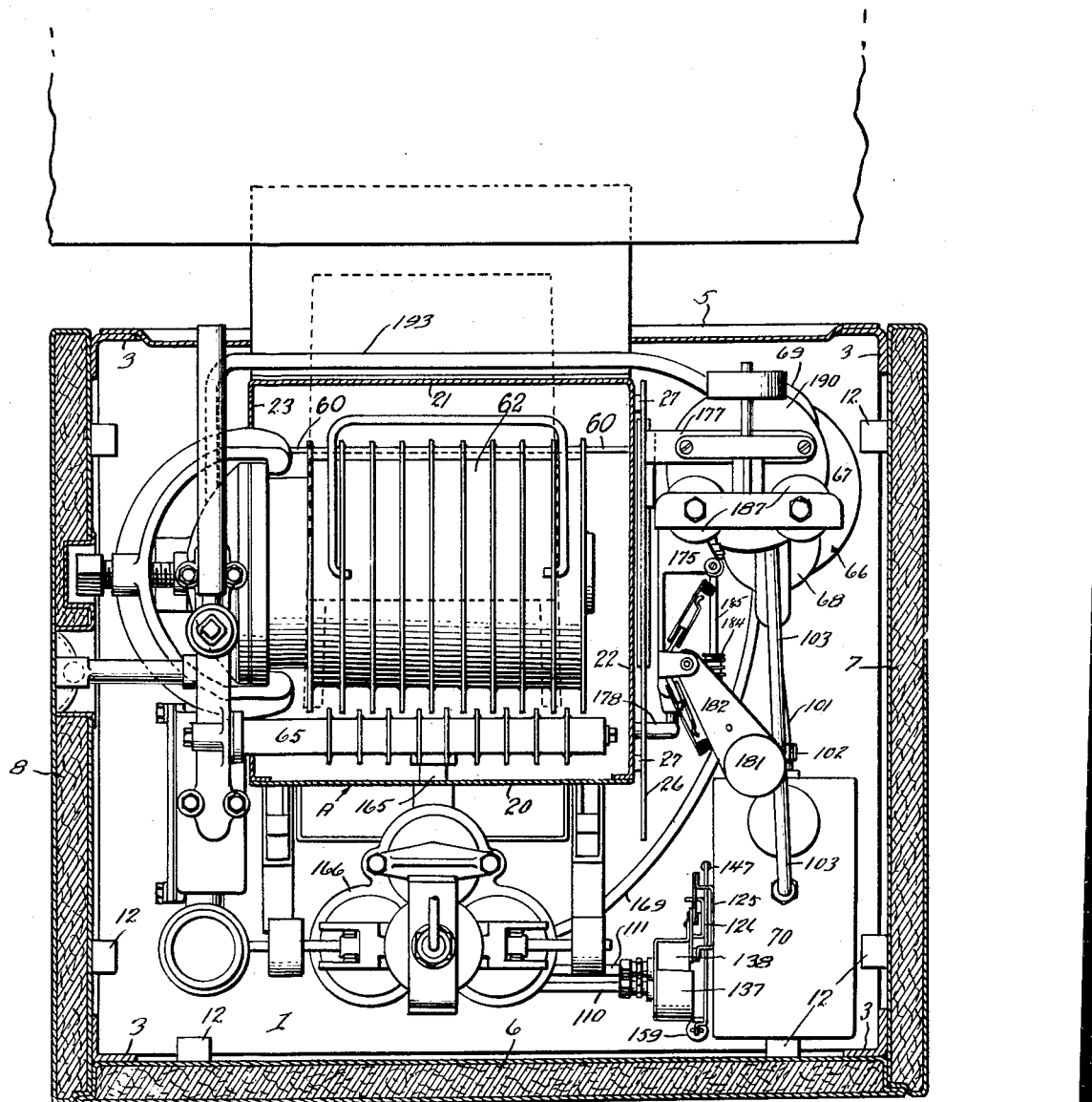
Figure 3:
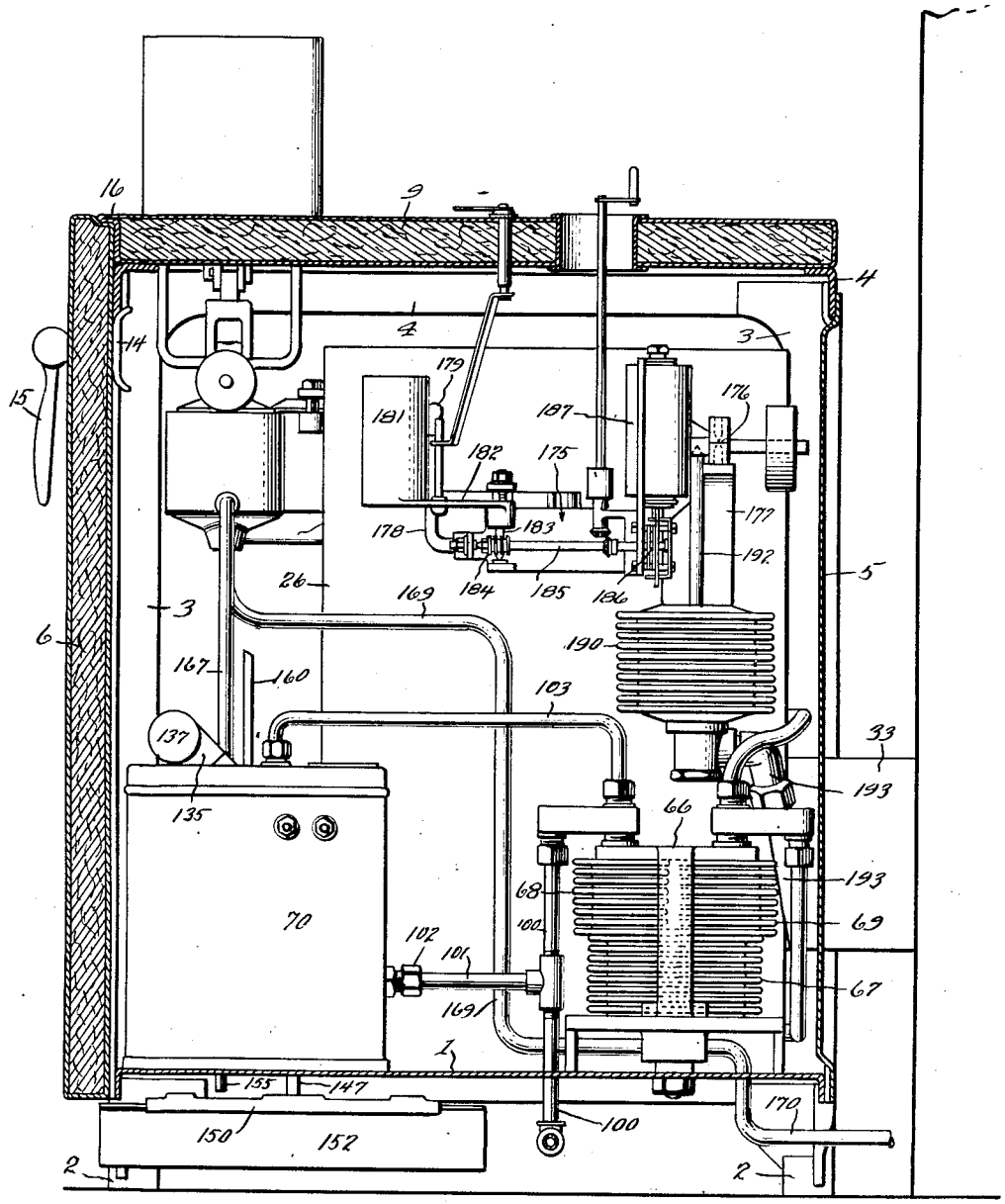
Figure 4:
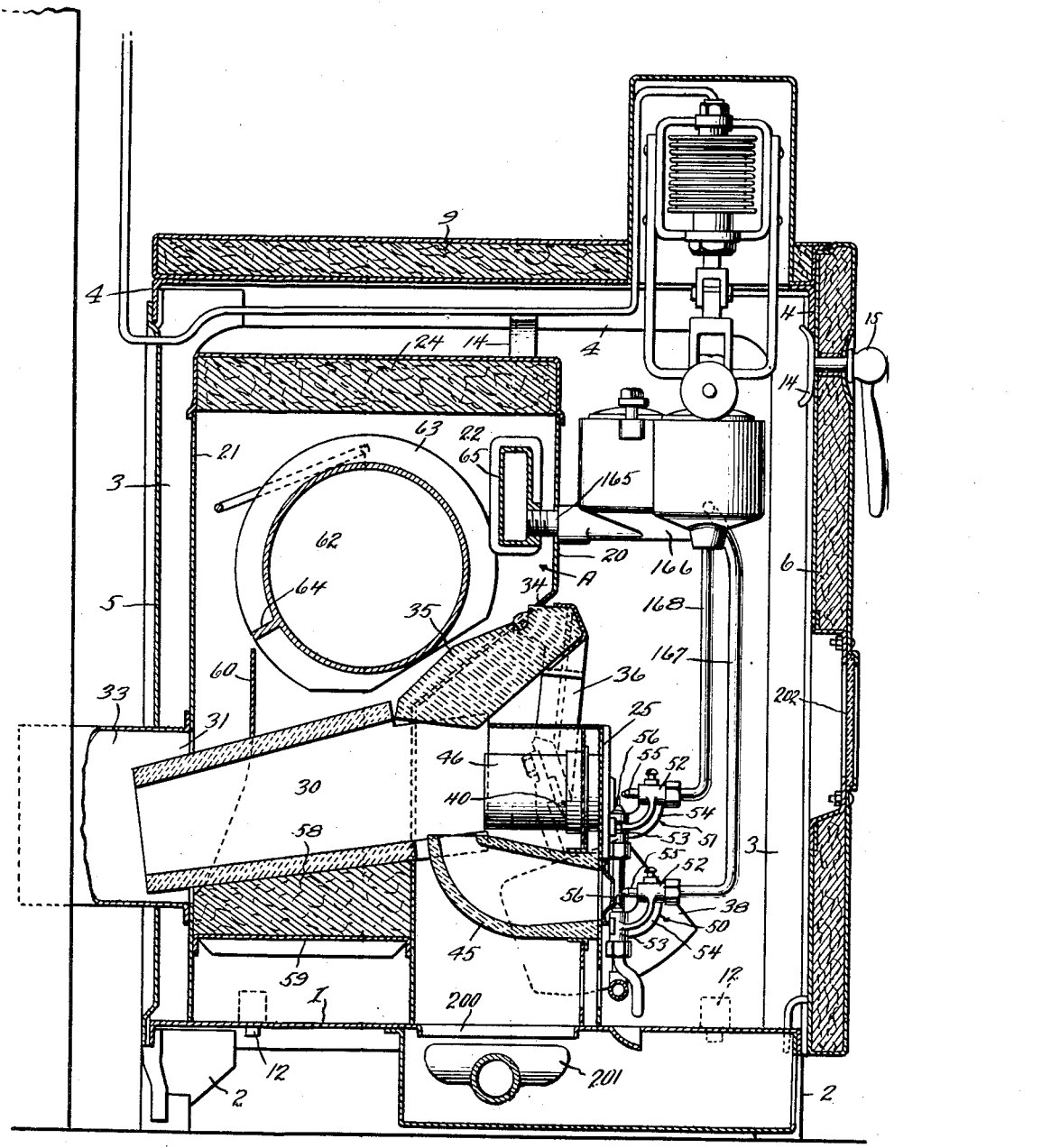
Figure 5:
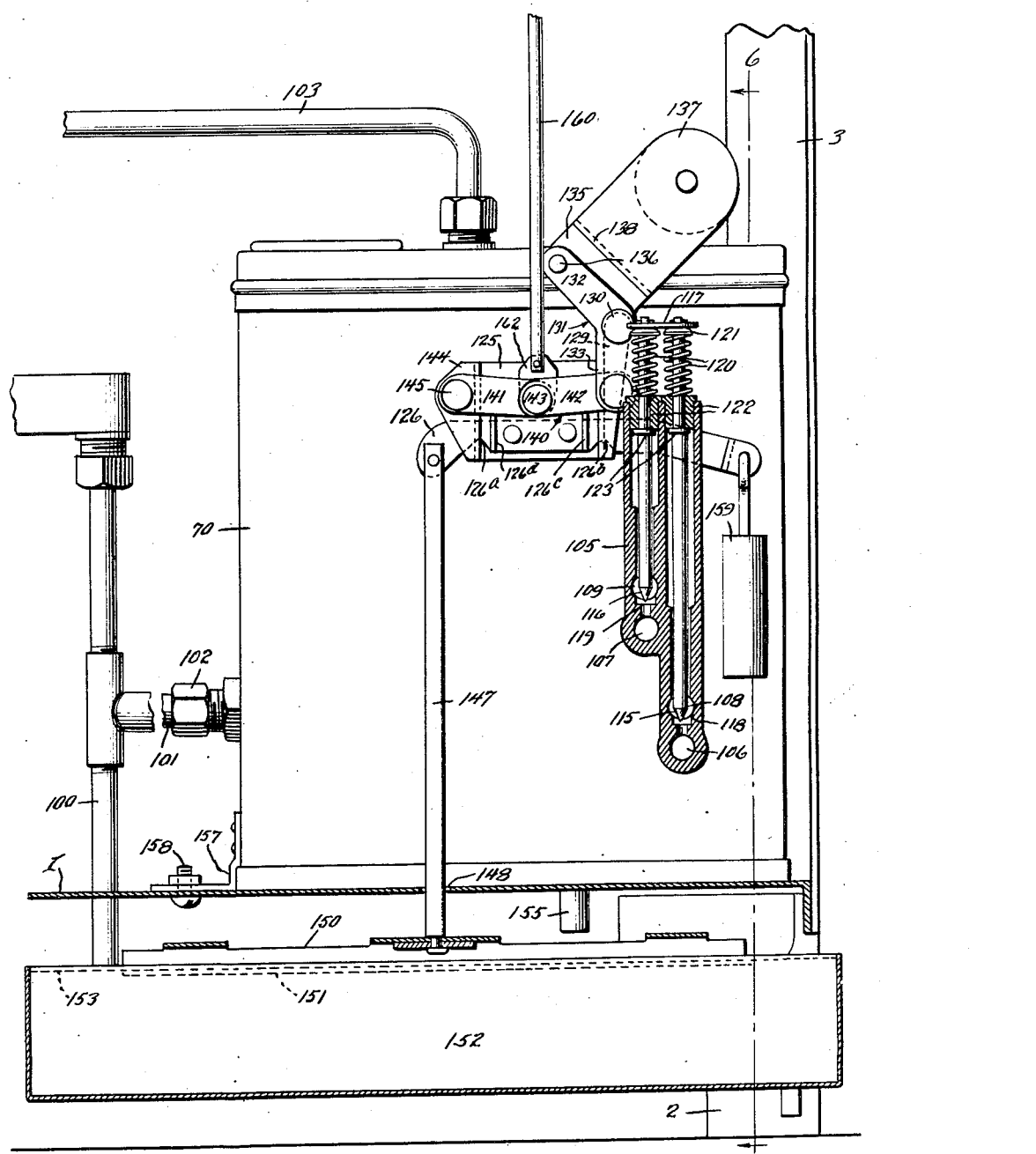

An embodiment of the invention wherein the foregoing objects, with others hereinafter appearing, are attained, is illustrated in the accompanying drawings wherein Fig. 1 is a front elevation of oil burning apparatus incorporating the invention, with the front wall of the casing removed; Fig. 2 is a sectional plan view of the apparatus; Figs. 3 and 4 are vertical sections through the apparatus on the respective lines 3—3 and 4—4 of Fig. 1, each view being taken as though looking in the direction indicated by the arrows associated with its respective section line; Fig. 5 is a left hand side elevation of the oil reservoir and the safety appliance associated therewith; Fig. 6 is a vertical section substantially on the line 6—6 of Figs. 5 and 7; Fig. 7 is a vertical section substantially on the line 7—7 of Fig. 6; Fig. 8 is a horizontal section substantially on the line 8—8 of Fig. 7, the oil reservoir being shown in plan with the cover removed; Fig. 9 is a fragmentary view, similar to Fig. 5, showing the safety appliance in condition to effect a closing of the valves which control the supply of oil to the main and auxiliary burners; Figs. 10 and 11 are perspective views of the supporting bracket and operating lever, respectively, of the safety appliance; Fig. 12 is a diagram of the electric circuit incorporated in the apparatus, and Fig. 13 is a schematic layout of the fuel feeding system.

Describing the invention by the use of reference characters, 1 designates a base that is preferably formed from a rectangular metal plate that is flanged downwardly about its periphery and is supported a suitable distance above the floor by legs 2. Rising from each corner of the base is a post 3 of angle formation, as shown in Fig. 2, and the tops of the posts are connected together by angle bars 4. A substantial frame is thus provided to which are applied the walls of a casing that encloses the operating parts of the oil burning apparatus. The rear wall 5 is shown as constructed of a single plate, while the front wall 6, respective right and left hand side walls 7 and 8, and the top wall 9, are insulated walls consisting of sheet metal shells that are filled with suitable non-heat conducting material. The front, side and top walls are preferably detachably connected to the frame, and as a convenient means of accomplishing this end, the front and side walls are provided, near their lower edges, with inwardly and downwardly extending tongues 12, the lower ends of which are reduced in size to fit within apertures in the base 1. Near their upper edges the front and side walls are equipped with buttons 14 for engagement with the angle bars 4, the same being adapted to be manipulated by handles 15 that are disposed on the outer sides of the walls and are suitably connected to the buttons. The top wall 9 rests upon the angle bars 4 and at its forward edge has a lip 16 which occupies a rabbeted portion of the front wall 6.

Rising from the base 1, about midway between the side walls 7 and 8, and near the back wall 5, is a housing A comprised of a front wall 20, rear wall 21, right and left hand side walls 22 and 23, respectively, and a lagged top wall or cover 24. This housing contains the combustion chamber, the steam generator, and the steam superheater, as will hereinafter more fully appear.

As will be seen by reference to Fig. 4, the lower portion of the front wall 20 is inset a material distance from the plane of its upper portion, and forwardly of the inset portion of said wall is disposed a supporting structure 25 that carries the main and auxiliary burners.

A plate 26 rises from the base 1 adjacent the right hand wall 22 of the housing A and may be secured thereto and spaced therefrom by suitable means, such as are indicated at 27, so as to impart rigidity to said plate.

The combustion chamber of the apparatus is designated 30, and it is preferably in the nature of a tubular body of suitable refractory material. This combustion chamber is supported within the lower portion of the housing A between the front and rear walls 20 and 21, said walls having openings for the accommodation of the respective ends of the chamber, the opening in the rear wall extending somewhat above the combustion chamber to provide a passage 31, which, with the combustion chamber, opens into a duct 33 that is applied to the wall 21 and projects through an opening in the rear wall 5 of the casing. The opening in the front wall 20 through which the corresponding end of the combustion chamber projects extends a material distance above said chamber to provide a passage 34 that is adapted to be closed by a damper 35. This damper is preferably in the nature of a body of suitable refractory material that is supported within a yoke 36. The lower ends of the side branches of the yoke 36 terminate in weights 38, and this damper unit which consists, generally, of the damper 35 and yoke 36, with its weights 38, is pivotally sustained by knife edge bearings 40 that rest within suitable bearings incorporated in the previously mentioned supporting structure 25. The weights 38 balance the damper unit on its knife-edge bearings, and an extra weight 43 (Fig. 1) that is applied to the forward side of the right hand branch of the damper unit in the approximate plane of its knife edge bearings, tends to rock the unit in a direction to withdraw the damper from the passage 34. A connecting means 44, in the nature of an eye, is carried by the weight 43 for a purpose that will presently appear.

Supported by the structure 25 in operative relation to the combustion chamber 30 are a main burner tube 45 and auxiliary burner tubes 46, that are preferably constructed of refractory material such as that used for the combustion chamber. The main burner tube 45 is directed inwardly and upwardly, while the tubes 46 associated with the auxiliary burners are extended directly inwardly.

Attached, as by fastening means or bolts 48 to the front wall of the supporting structure 25 are the main burner 50 and the auxiliary burners 51. These burners are identical with one another in construction and are of the injector type, each consisting of angularly disposed tubular bosses 52 and 53 that are connected together by a curved neck 54 and through which are fitted, respectively, a steam nozzle 55 and an oil jet 56.

As shown in Fig. 4, the combustion chamber 30 is bedded in a body 58 of suitable heat insulating material that is supported by a plate 59 disposed between the front, rear and side walls of the housing A. A partition 60 extends between the side walls 22 and 23 of the housing and above the combustion chamber and is spaced a suitable distance forwardly of the rear wall 21 so as to serve as a baffle to prevent a direct passage of the products of combustion from the passage 34 to the passage 31.

Occupying the portion of the housing above the combustion chamber 30 is a steam generator or boiler 62 that is shown as provided with circumferential heat abstracting veins 63 and with a longitudinal rib 64 which is disposed adjacent the partition 60 and serves the same purpose as said partition.

Forwardly of the generator or boiler 62 and within the housing A is a steam superheater 65. Intercommunication is established between the generator and superheater, and the former is supplied with water, through suitable conduits and passageways, but inasmuch as these elements form no part of my present invention, and their details may be had by reference to my above mentioned application, they will not be described herein. I may add, however, that on the rear right hand corner of the base is supported a steam operated pump 66 that incorporates a steam compartment 67, an oil pumping compartment 68, and a water pumping compartment 69, the latter constituting a part of the system through which water is supplied to the generator.

At the front, right hand corner of the apparatus, and resting directly upon the base 1, is an oil reservoir 70 which, as shown in Figs. 6 and 7, contains compartments 71 and 72, the former having an overflow tube 73 that leads to the compartment 72, while the latter compartment has an overflow tube 74 that discharges into a tilting bucket 75 that is supported, through knife-edge bearings 76, in V notches of bearing plates 77 that are applied to the sides of the reservoir 70. A valve casing 78 is rigidly secured to the rear wall of the reservoir 70, and the same is provided with inlet and outlet openings 79 and 80, respectively, between which is a valve seat 81 wherewith a valve 82 cooperates. The stem of this valve is guided through a bore in the lower end of the casing 78 and the end of said stem is adapted to be engaged by the bottom of the bucket 75. A spring 83 occupies the valve casing 75. A spring 83 occupies the valve casing and is compressed between a plug 84, that closes the upper end of the casing, and a spring seat 85 which has a central point bearing on the valve 82. By this arrangement, an even seating of the valve is assured.

A tilting cup 90 is supported, through knife-edge bearings 91, in the V notches of bearing plates 92 that are carried by the side walls of the reservoir 70, and said cup is normally overbalanced by a weight 93 that is secured, as by a bracket 94, to the rear side of the cup. Adapted to rock with the cup 90 is a mercury, electric switch 95 which is shown in the present instance as being carried, through straps 96, by the weight 93. The switch 95 is of a well known type that is especially suitable for use in the presence of inflammable liquids, gases, or explosives, and it may be briefly described as consisting of a hermetically sealed glass vessel containing a quantity of mercury which, when the vessel is tilted in one direction, closes a circuit by bridging two enclosed contact points and, when the vessel is tilted in the other direction, opens the circuit by withdrawing from one or both of said contact points. The purpose of this switch or circuit closer will presently be explained.

The oil pumping compartment 68 of the previously mentioned pump 66 receives oil from a suitable source (not shown) through a pipe 100. A branch 101 of said pipe has connection, through a union 102, with the outlet 80 of the valve casing 78. Oil is expelled from the compartment 68 of the pump through a pipe 103 which leads through the top wall of the reservoir 70 in position to discharge into the tilting cup 90.

A fitting 105 (Figs. 1, 5, 6, 8 and 9) has two passageways 106 and 107 which communicate, respectively, through the tubular extensions 108 and 109, with the compartments 72 and 71 of the oil reservoir. Passageway 106 also communicates through a pipe 110 with the oil jet 56 of the main burner 50, while the passageway 107 communicates, through a branched pipe 111, with the oil jets of the auxiliary burners 51.

It is clear from the foregoing that the compartment 72 of the oil reservoir supplies the main burner with fuel and that the compartment 71 supplies fuel to the auxiliary burners, the oil level in the oil jets of the respective burners being determined by the height of the overflow tube of the corresponding compartment.

As best shown in Figs. 5 and 9, the passageways 106 and 107 are controlled by needle valves 115 and 116, respectively, the stems of said valves projecting a material distance above the upper end of the fitting 105 where they are provided with a common abutment 117. The valves are normally maintained off their seats (which are designated 118 and 119, respectively) by springs 120 that surround the exposed portions of the valve stems and are interposed between washers 121 that bear on the abutment 117, and the outer ends of bushings 122 which are fitted into the upper ends of the bores of the fitting 105 and wherein the valve stems are guided. Upward movement of the valves is limited by collars 123 on the valve stems that are arranged to engage the inner ends of the bushings 122.

In considering the operation of the oil circulating system, it will be assumed that both compartments 71 and 72 are filled with oil to the height of their overflow tubes, and that sufficient oil is present in the bucket 75 to cause said bucket to be overbalanced. In this position, the rear end of the bucket is elevated and its bottom wall engages and lifts the stem of the valve 82, causing said valve to be maintained off its seat in opposition to the pressure of the spring 83. Now, with the pumping apparatus in action, oil is drawn through the valve casing 78 from the bucket 75, through the branch pipe 101 and pipe 100 to the oil compartment 68 of the pump 66 and expelled from said compartment through pipe 103 to the oil reservoir. The pipe 103 discharges, as previously stated, into the tilting cup 90, and when a sufficient quantity of oil has accumulated within said cup to overbalance the weight 93 and the parts associated with it, the cup will tilt and spill its contents into the compartment 71. This tilting action of the cup 90 is intermittent and continues as long as the apparatus is in operation.

While there is sufficient oil in the bucket 75 to maintain it in its tilted position, the valve 82 will remain open and at least a part of the demand of the oil compartment 68 of the pump will be satisfied from this source. The remainder of the oil demanded by the pump will be drawn through the pipe 100 directly from the source of oil supply (not shown). When an insufficient quantity of oil is present in the bucket 75 to maintain it in its tilted position, the valve 82 will be closed by the spring 83 in which case all the oil demanded by the pump will be drawn directly from the source of supply.

Associated with the valves 115 and 116, above described, is a safety appliance which acts automatically to close said valves and thus shut off the supply of oil to the main and auxiliary burners, in case the valve 82 should become stuck, or the bucket 75 fail to tilt, or in case the apparatus becomes overheated. This safety contrivance may also be manually operated from a remote point, through suitable connections, to shut off the oil supply to the burners in case of an emergency. The safety appliance is best shown in Figs. 5, 6, 9, 10 and 11.

A bracket 125, shown in perspective in Fig. 10, and which is preferably formed of a sheet metal stamping, is riveted or otherwise secured to the side wall of the oil reservoir 70 in juxtaposition to the upper end of the fitting 105. A lever 126, shown in perspective in Fig. 11, extends through slots 127 in opposed parallel portions of the bracket 125, and knife-edge bearings, formed at the bottom of the slots 127, are received by notches in the lever 126. Thus two fulcrums are provided for the lever 126 and they are designated 126$^a$ and 126$^b$. Lugs 126$^c$ and 126$^d$ extend laterally from the lever 126, and these are conveniently formed by the right angle end portions of a plate that is riveted or otherwise secured to the side of the lever. To the upper end of an arm 129 of the bracket 125 are pivoted, through a pin or rivet 130, a bell crank 131—having branches 132 and 133—and a plate 135. A portion of said plate lies alongside the branch 132 of the bell crank 131 and is connected to said branch by a rivet or element 136 of fusible material. The end of the plate 135 opposite that connected to the bell crank 131 carries a weight 137, and the end portions of said plate 135 are offset with respect to each other to form intermediate thereof a transverse portion 138 (Fig. 6). When said plate is permitted to swing under the influence of the weight 137, the transverse portion 138 falls upon the abutment 117 that is carried by the upper ends of the stems of valves 115 and 116, the weight 137 being of sufficient heft to overcome the springs 120 and close said valves. The free end of the branch 133 of the bell crank 131 is connected, through a toggle joint 140— comprised of links 141 and 142 that are pivotally connected together at 143—with an offset portion 144 of the bracket 125, the connection between the toggle joint and said portion of the bracket being of a pivotal nature and designated 145.

When the parts are in normal condition, the lever 126 rests on its two fulcrums 126$^a$ and 126$^b$ and the knee of the toggle joint 140 is below a straight line between the end pivots of the joint, as shown in Fig. 5.

Under the influence of the weight 137 the parts are held in this condition with the links of the joint bearing upon the lugs 126$^c$ and 126$^d$ of the lever 126.

A rod 147 is pivotally connected to and depends from the rear end of the lever 126 and its lower end extends through an opening 148 in the base 1. Secured to the rod below the base is a carrier 150. This carrier is in the nature of a sheet metal frame which has its lateral edges turned downwardly and inwardly to form supporting rails 151, as best shown in Fig. 6. A pan 152 is removably supported by the carrier 150 through flanges 153 which extend outwardly from the upper edges of its side walls and rest on the rails 151. A drain tube 155 extends from the bottom of the oil reservoir 70 through an opening 156 in the base 1 and is arranged to discharge into the pan 152. The reservoir 70 is shown as secured to the base 1 by an angle plate 157, one branch of which is riveted or otherwise secured to the rear wall of the reservoir, while the other branch is shown as fastened by a bolt 158 to the base. Suspended from the end of the lever 126 opposite that to which the rod 147 is connected is a weight 159, the purpose of which will presently appear.

In case a condition arises preventing the tilting of the bucket 75, or in the event the valve 82 sticks in closed position and fails to open in response to pressure applied to its stem by an overbalanced condition of the tilting bucket, the oil which continues to be pumped into the reservoir overflows the bucket 75 and drains through the tube 155 into the pan 152. When sufficient oil has accumulated within the pan to effect such action, the combined weight of the oil and pan pulls down the end of the lever 126 to which the pan is connected (through the carrier 150 and rod 147) and rocks said lever on its fulcrum 126$^a$, causing the lug 126$^c$ of said lever to lift the toggle joint 200, breaking it above center and thus releasing the weight 137. As this weight drops, it forcibly projects the transverse portion 138 of the plate 135 against the abutment 117 and depresses the valves 115 and 116 onto their respective seats against the tension of the springs 120 to shut off the supply of oil to the burners, thereby stopping the operation of the apparatus.

Until the pan 152 containing the oil is removed from the carrier 150, the parts will remain in the condition described, avoiding the resetting of the toggle and the suspension of the weight 137 in its normal position. The pan 152 is now removed from the carrier and emptied, and to avoid the apparatus being placed in condtion for operation before the pan is returned to the carrier 150, the weight 159 is employed, the same functioning as I shall now describe. The weight 159 is of sufficient heft to overbalance the carrier 150 and the rod 147 and rock the lever 126 on its fulcrum 126<sup>b</sup>, thus elevating the lug 126<sup>d</sup> to a position wherein it obstructs the return of the toggle 200 to its normal and weight sustaining condition. As soon as the pan 152 is returned to the carrier, the lever 126 is swung to its original condition wherein it rests on both fulcrums and the toggle and weight may now be reset to normal position. The springs 120 lift the valve 115 and 116 from their seats and communication between the oil supply and burners is accordingly resumed.

In case the apparatus becomes unduly overheated from any cause, the fusible element 136 is melted, releasing the plate 135 from the branch 132 of the bell crank 131, whereupon the weight 137 will throw the plate 135 into valve depressing position thereby to close the valves and shut off the burners.

In case of an emergency in which it is desirable to shut down the apparatus, the safety appliance may be tripped from a remote point through connections involving a rod 160 which has secured to its lower end a plate 162 that is pivoted to the knee of the toggle 140. By lifting the rod the toggle may be tripped and the weight 137 released. Also, by depressing the rod, the mechanism may be reset.

Steam from the superheater 65 is led through a connection 165 to a steam box 166 from which it is distributed through a pipe 167 to the main burner 50, through pipes 168 to the auxiliary burners 51, and through a pipe 169 to the steam compartment 67 of the pump 66, the steam being exhausted from said compartment through a pipe 170. The steam box 166 houses pressure actuated valves through which the auxiliary burners are automatically thrown into and out of operation as the steam pressure rises above and falls below predetermined values, but as this feature constitutes no part of the present invention, it is deemed unnecessary to disclose it in this case.

Incorporated in the apparatus is what I have referred to, in the previously mentioned application of which this is a division, as the "damper control". It will be seen by reference to said application that this damper control is a rather intricate mechanism, involving a counterbalanced structure that incorporates a shiftable weight, electromagnetic means governed by a so-called room thermostat for shifting said weight. The structure is operatively connected to the damper 35, and is swung in a direction to move the damper toward closed position by a pressure operated device that is in communication with the generator 62.

The damper control is located alongside the plate 26, and the counterbalanced structure that forms the major portion of it is designated generally by the reference numeral 175. The structure is fulcrumed at 176 (Fig. 3) within a bracket 177 that is carried by and extends laterally from the plate 26. The forward end of the structure, constituted of a rod 178 that extends upwardly and laterally through an opening 179 in the plate 26, has connection through a chain 180, with the previously mentioned eye 44 of the weight 43 that is mounted on and extends forwardly from the right hand branch of the yoke 36 of the damper unit.

The shiftable weight of the counterbalanced structure is designated 181 and its carrying arm 182 is pivoted on a vertical spindle 183 that has driving connection through worm gearing 184 with a shaft 185 which, in turn, is driven through mechanism 186, by electromagnetic means 187. As illustrated diagrammatically in Fig. 12, the electromagnetic means 187 and the mercury switch 95 are in circuit with a suitable source of electric energy designated B and with a so-called room thermostat T. For a more complete disclosure of this phase of the invention, reference may be had to the above identified application of which this is a division. It will be remembered that the switch 95 is moved to and fro while the apparatus is in operation which causes an intermittent energization of the electromagnetic means 187. It may be explained that as the room thermostat is caused to operate by temperature changes affecting it, it functions, through the electromagnetic means, to shift the weight 181 toward and from the fulcrum of the counterbalanced structure 175. It may also be pointed out that the structure 175 is biased in a direction to relax the chain 180 and permit the weight 43 to swing the damper unit in a direction to withdraw the damper 35 from the opening 34.

A pressure operated device 190, in the nature of a bellows, is supported below the rear end of the counterbalanced structure 175 and has operative connection therewith, immediately forwardly of the fulcrum of said structure, through a thrust rod 192. Communication is established between the device or bellows 190 and the steam generator 62 through a conduit 193. It will be seen from this that the tendency of the counterbalanced structure to move the damper 35 from the opening 34 is opposed, with greater or less force, according to the steam pressure, by the pressure device 190; and that the resistance to such opposing force varies accordingly as the weight 181 is shifted toward and from the fulcrum of the counterbalanced structure 175. All of this is fully illustrated and described in the above mentioned application and inasmuch as it enters into the present invention only in general combination with the other elements, a more specific illustration and description of the structure in this case is thought to be unnecessary.

Below and in register with an opening 200 in the base 1 beneath the burner tubes 45 and 46 is a preheating burner 201, shown as a gas burner. The preheating burner—the products from which rise through the opening 34 in the top wall of the combustion chamber and pass about the generator 62—is used to initially heat the generator and create steam for setting the injector burners in operation. The action of the main and auxiliary burners may be observed through a window 202 in the front wall 6 of the casing.

Having thus described my invention, what I claim is:—

1. In combination, a liquid supply, a chamber having an overflow and wherein liquid is to be maintained at a substantially constant level by said overflow, a movable vessel arranged to receive the overflow liquid, a pump and its connections for drawing liquid from the supply and from said vessel and discharging it into the chamber, and means operated by the vessel to cause the pump to draw liquid from the supply when the level of liquid in the vessel is comparatively low and to draw liquid from the vessel when the liquid level therein is comparatively high.

2. In combination, a liquid supply, a chamber having an overflow and wherein liquid is to be maintained at a substantially constant level by said overflow, a movable vessel arranged to receive the overflow liquid and biased to move in one direction, a pump and its connections for drawing liquid from the supply and from said vessel and discharging it into the chamber, and means operated by the movement of the vessel to cause the pump to draw liquid from the supply when the quantity of liquid in the vessel is so depleted as to permit the vessel to move in one direction, and to draw liquid from the vessel when the quantity of liquid therein is sufficient to cause the vessel under the weight of said liquid to move in another direction.

3. In combination, a liquid supply, a chamber having an overflow and wherein liquid is to be maintained at a substantially constant level by said overflow, a movable vessel arranged to receive the overflow liquid, a pump and its connections for drawing liquid from the supply and from said vessel and discharging it into the chamber, and means operated by the movement of the vessel to cause the pump to draw liquid from the supply when the vessel is substantially empty and to draw liquid from the vessel when the latter is substantially full.

4. In combination, a liquid supply, a chamber having an overflow and wherein liquid is to be maintained at a substantially constant level by said overflow, a vessel arranged to receive the overflow liquid and supported in unstable equilibrium so that when filled to one level it will tip in one direction and when filled to a greater level it will tip in the other direction, a pump and its connection for drawing liquid from the supply and from the vessel and discharging it into the chamber, and means actuated by the vessel when the same is tipped in the first direction for causing the pump to draw liquid from the supply, and when the vessel is tipped in the other direction for causing the pump to draw liquid from the vessel.

5. In combination, a liquid supply, a chamber having an overflow and wherein liquid is to be maintained at a substantially constant level by said overflow, a movable vessel arranged to receive the overflow liquid, a pump and its connections for drawing liquid from the supply and from said vessel and discharging it into the chamber, a valve between the pump and vessel tending to remain closed, and operative connections through which the valve is opened by movement of the vessel resulting from an accumulation of liquid therein.

6. In combination, a liquid supply, a chamber having an overflow and wherein liquid is to be maintained at a substantially constant level by said overflow, a movable vessel arranged to receive the overflow liquid, a pump, a conduit leading from the liquid supply to the pump, a second conduit for conducting liquid from the pump to the chamber, a branch in the first conduit leading to the movable vessel whereby the pump is adapted to draw liquid from said vessel, a valve in said branch tending to remain closed, and operative connections through which the valve is opened by movement of the vessel due to an accumulation of liquid therein.

7. In combination, a liquid fuel supply, a burner, a dispensing chamber from which the burner is supplied with fuel, the chamber having an overflow for maintaining therein a substantially constant liquid level, a movable vessel arranged to receive liquid overflowing from said chamber, a pump and its connections for drawing liquid from the supply and from said vessel and discharging it into said chamber, a valve between the pump and said vessel tending to remain closed, operative connections through which the valve is opened by movement of the vessel due to an accumulation of liquid therein, and means actuated by liquid overflowing from the vessel for shutting off the burner.

8. In combination, a liquid fuel supply, a main and an auxiliary burner of the injector type, means for supplying pressure fluid to said burners, the burners being at different elevations, dispensing chambers from which fuel is supplied to the respective burners and which are arranged at corresponding elevations, the higher chamber having an overflow which discharges into the lower chamber, the latter chamber having an overflow, a movable vessel arranged to receive the overflow from the lower chamber, a pump and its connections for drawing liquid from the supply and from said vessel and discharging it into the higher chamber, a valve between the pump and said vessel tending to remain closed, and operative connections through which the valve is opened by movement of the vessel due to an accumulation of liquid therein.

9. In combination, a liquid fuel supply, a main and an auxiliary burner of the injector type, means for supplying pressure fluid to said burners, the burners being at different elevations, dispensing chambers from which fuel is supplied to the respective burners and which are arranged to corresponding elevations, the higher chamber having an overflow which discharges into the lower chamber, the latter chamber having an overflow, a movable vessel arranged to receive the overflow from the lower chamber, a pump and its connections for drawing liquid from the supply and from said vessel and discharging it into the higher chamber, a valve between the pump and said vessel tending to remain closed, operative connections through which the valve is opened by movement of the vessel due to an accumulation of liquid therein, and means actuated by liquid overflowing from the vessel for shutting off the burners.

10. In combination, a liquid fuel supply, liquid fuel burning apparatus, electromagnetic means for controlling said apparatus, a circuit including said means, a switch in said circuit, a movable liquid receiver for opening and closing said switch as the receiver is moved to and fro by the deliverance of liquid thereto and the discharge of liquid therefrom, a dispensing chamber from which the liquid fuel burning apparatus is supplied with fuel, the aforesaid receiver being arranged to discharge liquid into said chamber, the chamber having an overflow for maintaining therein a substantially constant liquid level, a movable vessel arranged to receive liquid overflowing from said chamber, a pump and its connections for drawing liquid from the supply and from said vessel and delivering it to said receiver, a valve between the pump and said vessel tending to remain closed, and operative connections through which the valve is opened by movement of the vessel due to an accumulation of liquid therein.

11. In combination, a liquid fuel supply, liquid fuel burning apparatus, electromagnetic means for controlling said apparatus, a circuit including said means, a switch in said circuit, an oscillating receptacle for opening and closing said switch as the receptacle is moved to and fro by the deliverance of liquid thereto and the discharge of liquid therefrom, a dispensing chamber from which the liquid fuel burning apparatus is supplied with fuel, the chamber having an overflow for maintaining therein a substantially constant liquid level, a movable vessel arranged to receive liquid overflowing from said chamber, a pump and its connections for drawing liquid fuel from the supply and from said vessel and delivering it to said oscillating receptacle, said receptacle being arranged to discharge its contents into the chamber, a valve between the pump and said vessel tending to remain closed, and operative connections through which the valve is opened by movement of the vessel due to an accumulation of liquid therein.

In testimony whereof, I hereunto affix my signature.

MARC RESEK.